US006788862B2

(12) United States Patent
Aitken et al.

(10) Patent No.: US 6,788,862 B2
(45) Date of Patent: Sep. 7, 2004

(54) MICROSTRUCTURED OPTICAL WAVEGUIDE HAVING LARGE OPTICAL NONLINEARITY

(75) Inventors: Bruce G. Aitken, Corning, NY (US); Douglas C. Allan, Corning, NY (US); Nicholas F. Borrelli, Elmira, NY (US); Karl W. Koch, III, Elmira, NY (US); James A. West, Painted Post, NY (US)

(73) Assignee: Corning, Inc., Corning, NY (US)

( * ) Notice: Subject to any disclaimer, the term of this patent is extended or adjusted under 35 U.S.C. 154(b) by 103 days.

(21) Appl. No.: 10/146,199

(22) Filed: May 14, 2002

(65) Prior Publication Data

US 2003/0215199 A1 Nov. 20, 2003

(51) Int. Cl.$^7$ .............................. G02B 6/02; G02B 6/22
(52) U.S. Cl. ........................ 385/122; 385/125; 385/126
(58) Field of Search ................................ 385/122, 125, 385/126, 123

(56) References Cited

U.S. PATENT DOCUMENTS

| | | | |
|---|---|---|---|
| 5,802,236 A | | 9/1998 | DiGiovanni et al. |
| 6,097,870 A | * | 8/2000 | Ranka et al. ............... 385/127 |
| 6,208,792 B1 | | 3/2001 | Hwang et al. .............. 385/129 |
| 6,520,689 B2 | * | 2/2003 | DeMartino et al. ........... 385/98 |
| 2002/0003923 A1 | * | 1/2002 | Ranka et al. ................. 385/28 |
| 2002/0122644 A1 | * | 9/2002 | Birks et al. ................. 385/125 |
| 2003/0095767 A1 | * | 5/2003 | Hiroishi et al. ............. 385/126 |
| 2003/0174985 A1 | * | 9/2003 | Eggleton et al. ............ 385/125 |

FOREIGN PATENT DOCUMENTS

| | | | |
|---|---|---|---|
| EP | 0 922 992 | 6/1999 | ............. G02F/1/35 |
| EP | 1 054 273 | 11/2000 | ............. G02B/6/16 |
| EP | 0 810 453 | 10/2001 | |
| WO | WO 02/14946 A1 | 2/2002 | |
| WO | WO 02/14946 | 2/2002 | |

OTHER PUBLICATIONS

B.R. Washburn et al., "Tunable near–infrared femtosecond soliton generation in photonic crystal fibres", Electronics Letters, vol. 37, No. 25, pp. 1510–1515, Dec. 6$^{th}$, 2001.
W.J. Wadsworth et al., "Soliton effects in photonic crystal fibres at 850 nm", Electronics Letters, vol. 36, No. 1, pp. 53–55, Jan. 6$^{th}$, 2000.
Jinendra K. Ranka et al., "Visible continuum generation in air–silica microstructure optical fibers with anomalous dispersion at 800 nm", Optics Letters, vol. 25, No. 1, pp. 25–27, Jan. 1, 2000.
Stéphane Coen et al., "White–light supercontinuum generation with 60–ps pump pulses in a photonic crystal fiber", Optics Letters, vol. 26, No. 17, pp. 1356–1358, Sep. 1, 2001.
W.J. Wadsworth et al., "Soliton effects in photonic crystal fibres at 850 nm", Electroincs Letters, vol. 36, No. 36, No. 1, pp. 53–55, Jan. 6$^{th}$, 2000.
A. Ferrando et al., "Nearly zero ultraflattened dispersion in photonic crystal fibers", Optics Letters, vol. 25, No. 11, pp. 790–792, Jun. 1, 2000.

(List continued on next page.)

*Primary Examiner*—John D. Lee
*Assistant Examiner*—Tina M Lin
(74) *Attorney, Agent, or Firm*—Svetlana Z. Short

(57) ABSTRACT

A microstructured optical waveguide that supports the propagation of an optical signal of a desired wavelength is described. The optical waveguide includes a core region formed from an optically nonlinear material having a γ of at least about $2.5 \times 10^{-19}$ m$^2$/W at 1260 nm. The optical waveguide also includes a cladding region surrounding the core region, the cladding region including a bulk material and a lattice of columns located in the bulk material, the lattice of columns having a pitch, and each column having a cross-sectional area. The pitch of the lattice and the areas of the columns are selected such that the dispersion of the optical signal at the desired wavelength is within the range of about −70 ps/nm-km to about 70 ps/nm-km.

30 Claims, 10 Drawing Sheets

OTHER PUBLICATIONS

J.C. Knight et al., "All–silica single–mode optical fiber with photonic crystal cladding", vol. 21, No. 19, pp. 1547–1549, Oct. 1, 1996.

J.C. Knight et al., "Anomalous Dispersion in Photonic Crystal Fiber", IEEE Photonics Technology Letters, vol. 12, No. 7, pp. 807–809, Jul. 2000.

Victor E. Perlin et al., "Nonlinear Pulse Switching Using Cros–Phase Modulation and Fiber Bragg Gratings", IEEE Photonics Technology Letters, vol. 13, No. 9, pp. 960–962, Sep. 2001.

T.M. Monro et al., "Chalcogenide holey fibres", Electronics Letters, vol. 36, No. 24, pp. 1998–2000, Nov. 23$^{rd}$, 2000.

Asobe, "Nonlinear Optical Properties of Chalcogenide Glass Fibers and Their Application to All–Optical Switching", Optical Fiber Technology 3, 142–148, 1997.

Knight et al., "Anomalous Dispersion in Photonic Crystal Fiber", IEEE Photonics Technology Letters, vol. 12, No. 7, Jul. 2000, p. 807–809.

Hasegawa et al., "Hole–assisted lightguide fiber for large anomalous dispersion and low optical loss", Optics Express, Dec. 17, 2001, vol. 9, No. 13, p. 681–686.

Knight et al., "New Ways to Guide Light", Apr. 12, 2002, vol. 296, SCIENCE, pp. 276–277.

Johnson et al., "Block–iterative frequency–domain methods for Maxwell's equations in a planewave basis", Jan. 29, 2001, vol. 8, No. 3, Optics Express, pp. 173–190.

* cited by examiner

MICROSTRUCTURED OPTICAL WAVEGUIDE HAVING LARGE OPTICAL NONLINEARITY

BACKGROUND OF THE INVENTION

1. Field of the Invention

The present invention relates generally to optical waveguides, and more specifically to microstructured optical waveguides having large optical nonlinearity.

2. Technical Background

Optical waveguides are used in optical applications where the optical nonlinearity of the waveguide provides a desired effect. For example, silica-based optical waveguide fibers are used to convey soliton pulses in the fiber based in part on the optical nonlinear effect of self-phase modulation. As another example, silica-based fibers are used in signal amplification or signal modification applications, such as parametric amplification, where the amplification depends on the optical nonlinearity of the fiber material.

In general, the polarization response of a material to an electric field due to light will have both a linear and a non-linear component. The linear component of the polarization response linearly increases with the electric field of the light. The non-linear component increases with higher order electric field terms, i.e., greater than the first power of the electric field.

For many applications, the third order component provides the most significant contribution to the nonlinearity of the fiber, and the nonlinearity may be approximately expressed in terms of the third order component alone. In such a case, the non-linear polarization $P^{NL}$ can be expressed as: $P_{NL} = \chi^{(3)} \times$(third order Electric field terms). Thus, $\chi^{(3)}$ is often used as a measure of the optical nonlinearity of a material.

Alternatively, optical nonlinearity may be expressed in terms of the change in refractive index due to the light intensity (which is proportional to the square of the electric field). The refractive index can be expressed as: $n = n_o + \Delta n$, where $n_o$ is the constant portion of the refractive index dependent only upon the frequency of the light, and $\Delta n$ is the refractive index change which is dependent on both frequency and intensity. At a given wavelength, the refractive index change $\Delta n$ can be expressed as: $\Delta n = \gamma I$, where I is the intensity of the light. Thus, $\gamma$ is an alternative expression for the nonlinearity of a material. For many materials, $\chi^{(3)}$ and $\gamma$ are related by the equation: $\chi^{(3)} \cong 6.3 \times n^2 \times \gamma$, where $\chi^{(3)}$ and $\gamma$ are measured in esu units.

Silica-based optical waveguide fibers are often used for optical applications that depend on the optical nonlinearity of the fiber material. Silica, however, is not a strongly nonlinear material. Thus, achieving the desired non-linear effects requires the implementation of undesirable compensation techniques, such as using higher intensity light or longer fiber lengths.

SUMMARY OF THE INVENTION

One aspect of the present invention relates to a microstructured optical waveguide, the optical waveguide supporting the propagation of an optical signal of a desired wavelength. The optical waveguide includes a core region and a cladding region. The core region is formed from an optically nonlinear material having a $\gamma$ of at least about $2.5 \times 10^{-19}$ m$^2$/W at 1260 nm. The cladding region surrounds the core region and includes a bulk material and a plurality of columns arranged in the bulk material, each column having a cross-sectional area. The number, arrangement, and areas of the columns are selected such that the dispersion of the optical signal at the desired wavelength is within the range of about −70 ps/nm-km to about 70 ps/nm-km.

Another aspect of the present invention relates to a microstructured optical fiber, the optical fiber supporting the propagation of an optical signal of a desired wavelength. The optical fiber includes a core region and a cladding region. The core region is formed from an optically nonlinear material having a $\gamma$ of at least about $2.5 \times 10^{-19}$ m$^2$/W at 1260 μm. The cladding region surrounds the core region and includes a bulk material and a plurality of columns arranged in the bulk material, each column having a cross-sectional area. The number, arrangement, and areas of the columns are selected such that the dispersion of the optical signal at the desired wavelength is within the range of about −70 ps/nm-km to about 70 ps/nm-km.

Another aspect of the present invention relates to an optical communication system for the propagation of an optical signal. The optical communication system comprises a microstructured optical waveguide, the optical waveguide supporting the propagation of an optical signal of a desired wavelength, a signal radiation source for providing the signal at the desired wavelength, and a signal coupler for coupling the signal into the optical waveguide. The optical waveguide includes a core region and a cladding region. The core region is formed from an optically nonlinear material having a $\gamma$ of at least about $2.5 \times 10^{-19}$ m$^2$/W at 1260 nm. The cladding region surrounds the core region and includes a bulk material and a plurality of columns arranged in the bulk material, each column having a cross-sectional area. The number, arrangement, and areas of the columns are selected such that the dispersion of the optical signal at the desired wavelength is within the range of about −70 ps/nm-km to about 70 ps/nm-km.

The waveguides and communications systems of the present invention result in a number of advantages over prior art waveguides and communications systems. For example, nonlinear phenomena at communications wavelengths can be exploited in the waveguides of the present invention at much lower powers than in conventional waveguides. Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

DETAILED DESCRIPTION OF THE PREFERRED EMBODIMENTS

Figure 1:
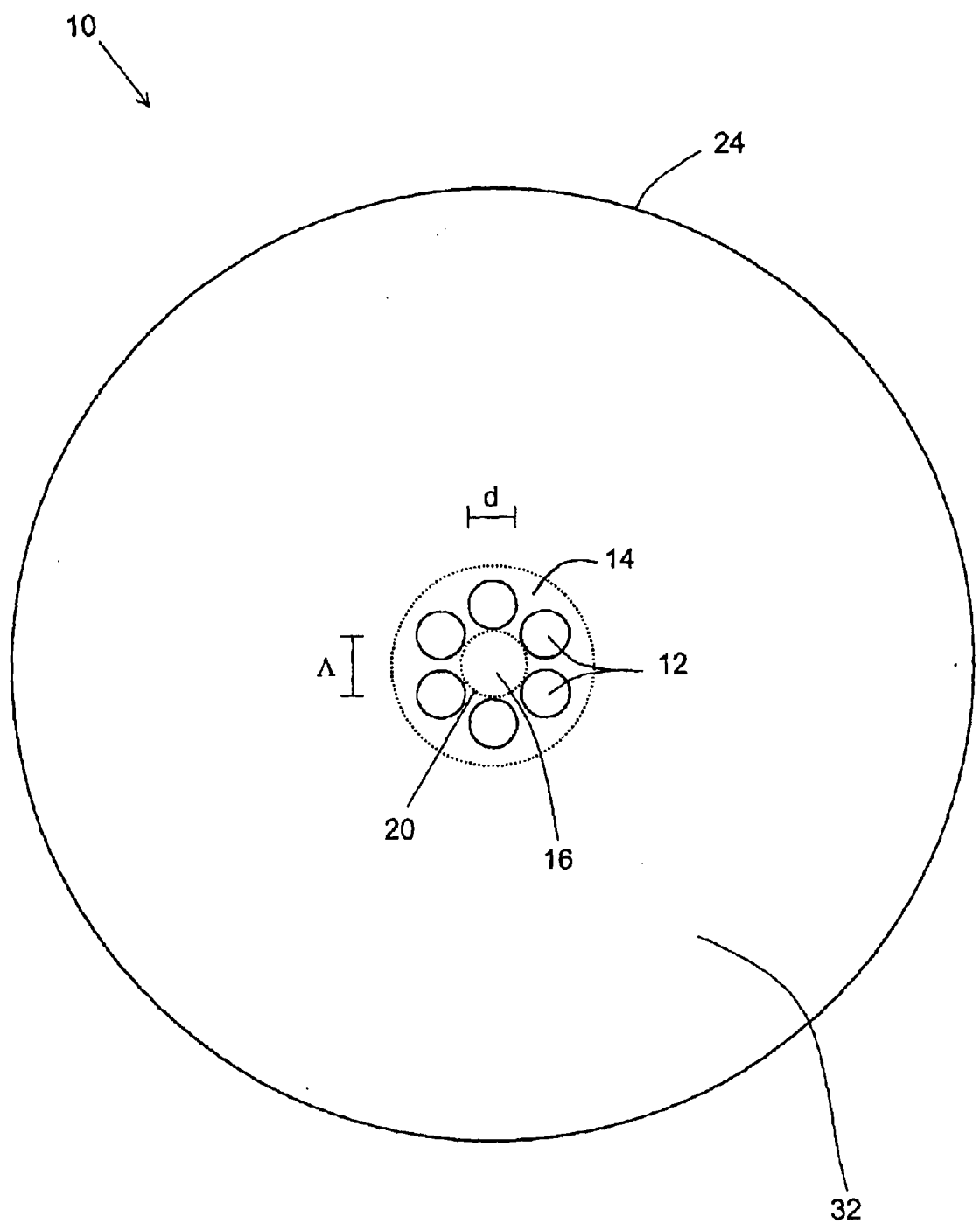
FIG. 1 is a schematic illustrating a cross-section of a microstructured optical fiber according to an embodiment of the invention.

Reference will now be made in detail to presently preferred embodiments of the invention, examples of which are illustrated in the accompanying drawings. An effort has been made to use the same reference numbers throughout the drawings to refer to the same or like parts.

The present invention relates to a microstructured optical waveguide having a high optical nonlinearity. The optical waveguide can be used in optical applications, such as soliton pulse propagation or parametric amplification, that depend upon the optical nonlinearity of the waveguide. The use of highly nonlinear optical material permits an optical waveguide to be configured to reduce the light power or intensity and/or the length of the waveguide required to produce the desired nonlinear effect.

Potentially suitable nonlinear optical materials include sulfide glasses, germanium arsenosulfide glasses, germanium arsenosulfoselenide glasses, germanium arsenoselenide glasses, heavy metal oxide glasses and tellurite glasses. The skilled artisan will choose the nonlinear optical material based on the desired physical and optical characteristics and manufacturing technologies to be used.

The present invention provides an optical waveguide that is made of highly nonlinear material, yet also has dispersion characteristics that make it suitable for use at typical telecommunications wavelengths. Dispersion causes broadening in a propagating optical pulse containing different wavelengths of light. The broadening occurs due to the difference in light transmission speeds at the different wavelengths. High dispersion means that the difference in transmission speed per unit wavelength is large, and thus the pulse broadening will tend to be large. The units of dispersion are typically given in ps/km-nm, where the ps/km-nm refer to the difference in light transit times (in picoseconds (ps)) per kilometer (km) of fiber for a unit difference in wavelength measured in nanometers (nm).

For a number of applications, some specific examples of which are discussed below, the desired nonlinear effect is enhanced by operating at a wavelength where the dispersion of the fiber is at or near zero, or, in the case of soliton pulse propagation, in the anomalous dispersion regime where the dispersion is only very slightly positive. It is also desirable in many of these optical applications to be able to operate at typical telecommunications wavelengths, i.e., less than 2000 nm.

Most highly nonlinear materials, however, have high material dispersion at wavelengths below 2000 $\mu$m. Thus, a conventional waveguide made from these materials would have a zero dispersion point at a wavelength well over 2000 nm. To operate at typical telecommunications wavelengths in an optical waveguide having near zero dispersion and comprising a typical highly nonlinear material, the waveguide must be constructed to compensate for the high material dispersion of the nonlinear material.

It is possible to provide an optical waveguide of a highly nonlinear material with the zero point dispersion set at typical telecommunications wavelengths by forming the waveguide as a micro structured optical waveguide. Micro structured optical waveguides include microstructures within the bulk of the waveguide. The microstructures vary in composition and/or index of refraction from the surrounding bulk material. The microstructures may be formed as columns in the cladding of the waveguide.

In a microstructured optical waveguide, the zero point dispersion of the waveguide can be set over a wide range of wavelengths by properly arranging the microstructures. For example, selection of an appropriate pitch and column diameter for a periodic lattice of column microstructures can cause the dispersion of the waveguide to be reduced.

The microstructured optical waveguide of the present invention can be, for example, a microstructured optical fiber. Of course, the present invention is not limited to optical fibers. A microstructured optical fiber has microstructures that form a refractive index pattern in the plane normal to the axis of the fiber. The refractive index pattern may be created by, for example, an arrangement of columns having one index extending parallel to the longitudinal axis of the fiber embedded within a matrix having another index. The columns are typically formed as voids or holes in the bulk material. The columns may be formed in a periodic lattice, or may be arranged in a substantially aperiodic fashion.

An example of a microstructured optical fiber 10 with a core region 20 is illustrated in cross-sectional view in FIG. 1. The approximate extent of the core region 20 is shown in FIG. 1 enclosed by dashed lines. The core region 20 is formed from a material with good nonlinear optical properties. Light propagating in the microstructured optical fiber will be substantially confined to the core region 20, and thus will experience the effects of the highly nonlinear material of the core 20.

The microstructured optical fiber 10 has a bulk cladding material 14 that may also have good nonlinear optical properties. Columnar holes 12 extend through the bulk surrounding material 14 and constitute microstructures. In this example, the holes 12 are arranged in a periodic hexagonal ring surrounding the core. FIG. 1 illustrates a microstructured with one ring of only six holes 12. Alternately, the microstructured optical fibers of this invention may include more than the six holes 12. For example, there may be two or three or more rings of holes surrounding the core region 20. In this example, the holes 12 have a hole diameter d, and a pitch Λ (the distance between centers of the holes). The core region 20 is shown at the center position of the ring structure and is formed from a highly nonlinear material. The center filled hole may be thought of as constituting a defect in the hexagonal lattice formed by the columnar holes.

The microstructured optical fiber 10 also includes cladding region 24 surrounding the core region 20. The bulk material 14 of the cladding region 24 may be the same as the material of the core region 20. However, it is not required that these materials be the same. For example, the cladding region 24 may comprise a material with a low nonlinearity. The waveguide will still provide a nonlinear effect to the light because the light at the wavelength of interest propagating in the waveguide will be substantially confined to the core region 20. The cladding region may include an inner cladding region 30 and an outer cladding region 32. The inner cladding region 30 closer to the core region 20 includes the holes 12, while the outer cladding region 32 is essentially devoid of holes. Light propagating in the fiber is substantially confined to the core region 20. This confinement is by the low effective index of the inner cladding region 30 due to the holes 12.

The holes 12 are formed in the bulk material 14 of the cladding region 24. The holes 12 can be filled with a gas or another material (e.g., a solid), or they may have a vacuum therein. Preferably, the index of refraction of holes 12 is less than that of the bulk material 14. Each of the holes 12 has a cross-sectional area A, and a diameter d. In this example, the arrangement of holes 12 also has a specific pitch Λ. If the waveguide has a central axis, the holes 12 may be formed substantially parallel to the axis. The holes 12 may have a circular cross-section, although other shapes may be used, such as oval or rectangular. The holes 12 may also have some deformation, and may have a tear-drop shape, for example, or some other shape.

The number, arrangement, and areas of the holes are selected such that the overall dispersion is low at the desired wavelength. The desired wavelength for many applications will be less than 2000 nm, i.e., typical telecommunication wavelengths. Thus, preferably the overall dispersion should have a desired near zero value at a wavelength less than about 2000 nm. More preferably the overall dispersion D has a desired near zero value in a wavelength range between 1200 and 1700 nm.

If the waveguide is to be used for applications benefiting from a low dispersion, as discussed below, preferably the overall dispersion D at the desired wavelength is within the range of about −70 ps/nm-km to about 70 ps/nm-km. More preferably the overall dispersion at the desired wavelength is within the range of about −35 ps/nm-km to about 35 ps/nm-km and most preferably within the range of about −10 ps/nm-km to about 10 ps/nm-km. The preferable dispersion for soliton propagation is, while not zero, only very slightly positive. For solition propagation applications the overall dispersion D at the desired wavelength is less than about 70 ps/nm-km.

The effect of the structural parameters of a microstructured optical fiber on zero point dispersion will be illustrated by calculating the dispersion of the microstructured optical fiber. The group velocity dispersion, or simply the dispersion D, of the microstructured optical fiber can be written approximately as a sum of the material dispersion and the waveguide contribution as follows:

$$D = -(\lambda/c)(d^2(n_m + n_{eff})/d\lambda^2) \qquad \text{Eq. 1}$$

where the first term $-(\lambda/c)(d^2 n_m/d\lambda^2)$ represents the material dispersion contribution, the second term $-(\lambda/c)(d^2 n_{eff}/d\lambda^2)$ represents the waveguide dispersion contribution, $n_m$ is the index of refraction of the bulk material, $\lambda$ is the light wavelength, c is the speed of light, and $n_{eff}$ is the effective index of refraction, which is defined through the relationship: $n_{eff} = \beta/(\omega/c_0)$. $\beta$ is the axial propagation constant of a mode with frequency ω in the microstructured optical fiber, and co is the speed of light in a vacuum. In other words, the electric field, E, of the mode varies as E=constant×exp(iβz) where z is the distance axially along the fiber.

The dispersion D of the microstructured optical fiber can be controlled by controlling the waveguide dispersion contribution. The material dispersion contribution is fixed for a given material, but the waveguide contribution to the dispersion D can be varied over a wide range by an appropriate choice of the structural parameters for the microstructured optical fiber. In particular, those parameters affect the effective index of refraction $n_{eff}$ and thus affect the waveguide dispersion contribution.

Figure 2:
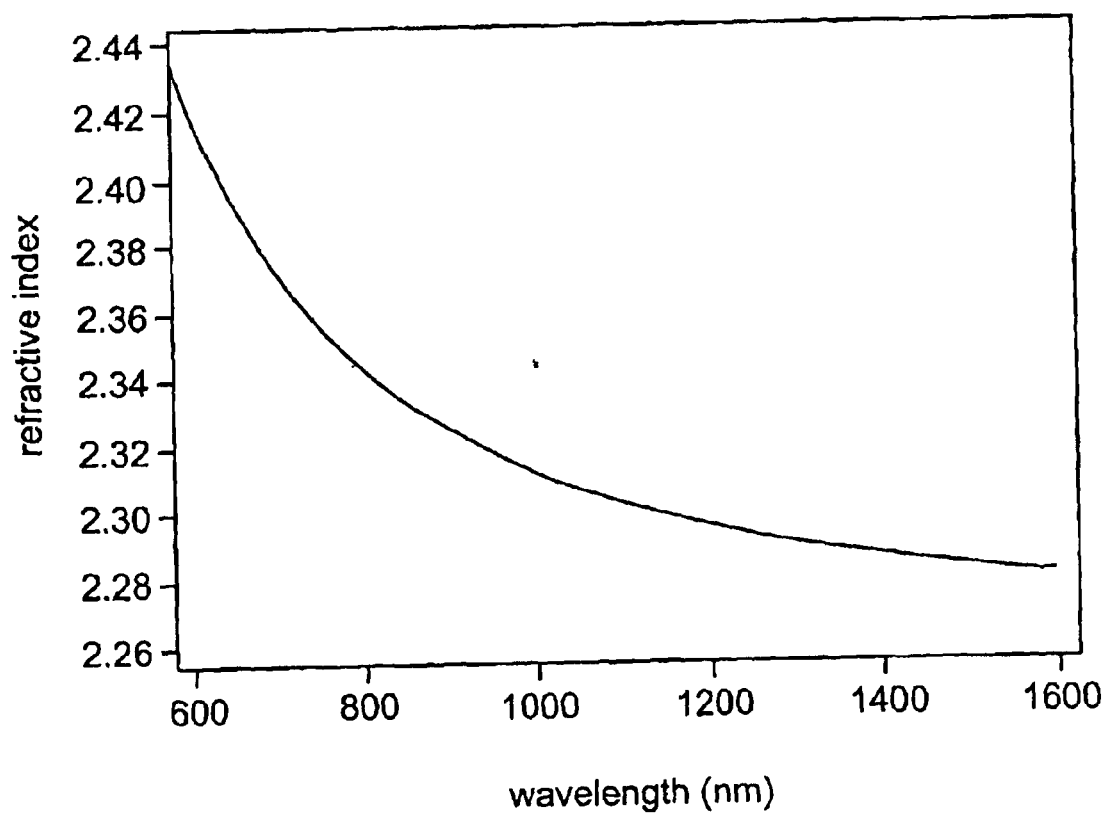
FIG. 2 is a graph illustrating the material index of refraction as a function of wavelength for glass #20 of Table 1.
Figure 3:
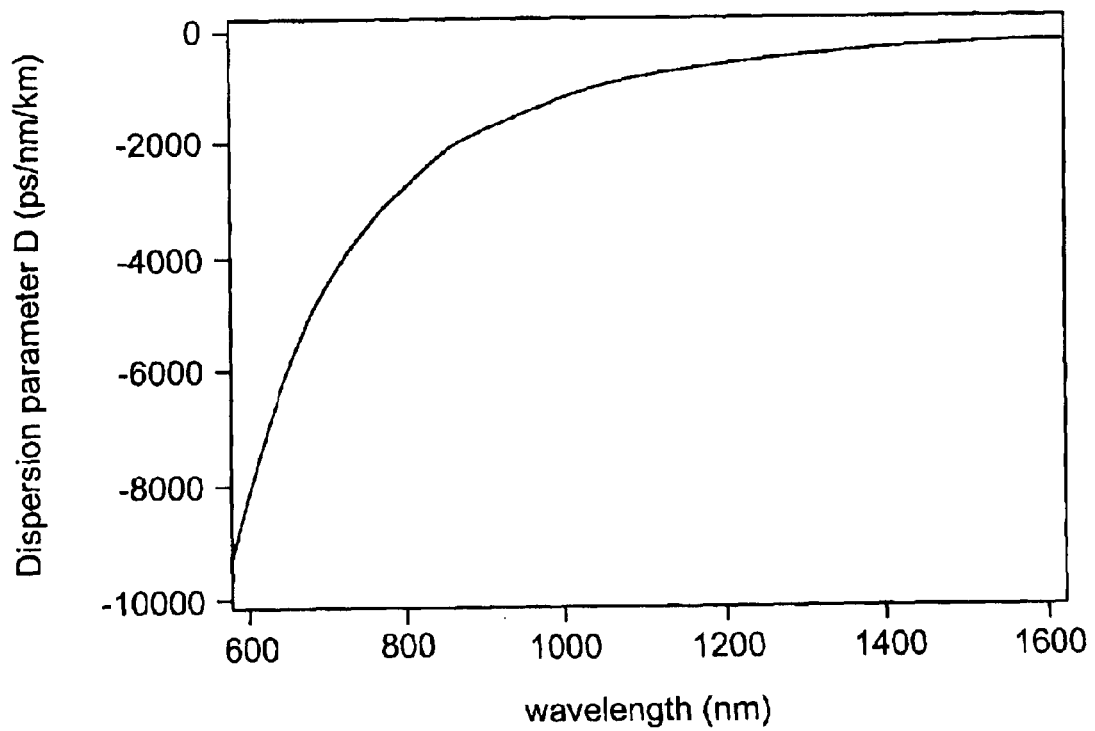
FIG. 3 is a graph illustrating the material dispersion as a function of wavelength for the nonlinear glass of FIG. 2.

In the microstructured optical fiber 10 of FIG. 1, the core 20 as well as the bulk surrounding material 14 is a highly nonlinear glass, such as glass #20 in Table 1, below, a germanium arsenosulfide glass having good nonlinear properties. The glass Sample #1 The material index of refraction $n_m$ and the material dispersion as a function of wavelength λ in microns (μm) for the glass Sample #1 are shown in FIGS. 2 and 3, respectively. As can be seen in FIG. 3, the material dispersion zero point (the wavelength at which dispersion is zero) is reached only at wavelengths greater than 2500 nm.

As is clear from Eq. 1, the total dispersion D of the microstructured optical fiber depends on the indexes of refraction, $n_m$ and $n_{eff}$ which in turn are dependent upon the relationship between the axial propagation constant, β, and the light mode frequency, ω, where c is the speed of light in vacuum and λ is the light wavelength. Therefore, if one can determine β as function of ω, the dispersion D can be calculated.

The relationship between β and ω can be determined in the following fashion, for example. β is determined for a series of frequencies ω. The material dispersion is accounted for by varying the index of refraction according to a predetermined Sellmeir relationship, i.e., the frequency dependent relation for the bulk-material refractive index. The Sellmeir relationship is a semi-empirical equation giving the variation of the index of refraction with wavelength, using adjustable constants to represent different optical materials. The expression is of the form:

$$n^2 - 1 = A_1 \lambda^2/(\lambda^2 - \lambda_1^2) + A_2 \lambda^2/(\lambda^2 - \lambda_2^2) + A_3 \lambda^2/(\lambda^2 - \lambda_3^2) \qquad \text{Eq. 2}$$

where n is the bulk material refractive index, λ is the wavelength, and $A_1$, $\lambda_1$, $A_2$, $\lambda_2$, $A_3$, and $\lambda_3$ are adjustable parameters that are fit to experimentally measured values of the index of refraction of the bulk material over a range of wavelengths.

The propagation constants of the light modes are computed using Maxwell's equations with periodic boundary conditions and a preconditioned conjugate-gradient minimization of the block Rayleigh quotient in a planewave basis. The computations can be performed using a software package freely available from the Massachusetts Institute of Technology (The MIT Photonic-Bands Package, Internet Uniform Resource Locator http://ab-initio.mit.edu/mpb/). The propagation constant for a given frequency is then determined using an iterative process. This computational technique is described in more detail in "Block-Iterative frequency-domain methods for Maxwell's equations in a planewave basis", Johnson, S. J. and Joannopoulos, J. D., Optics Express, 8(3), 173–190 (2001). The method of determining the relationship between $\beta$ and $\omega$ is not limited to that disclosed above. Any program or software package that provides the relationship between $\beta$ and $\omega$ can be used. For example, programs available from the RSoft Corporation can be used, such as BeamPROP™ or FullWAVE™.

Once the relationship between $\beta$ and $\omega$ is determined, the dispersion D can be calculated through differentiation as in Eq. 1 above with the index of refraction expressed in terms of $\beta$ and $\omega$.

Figure 4:
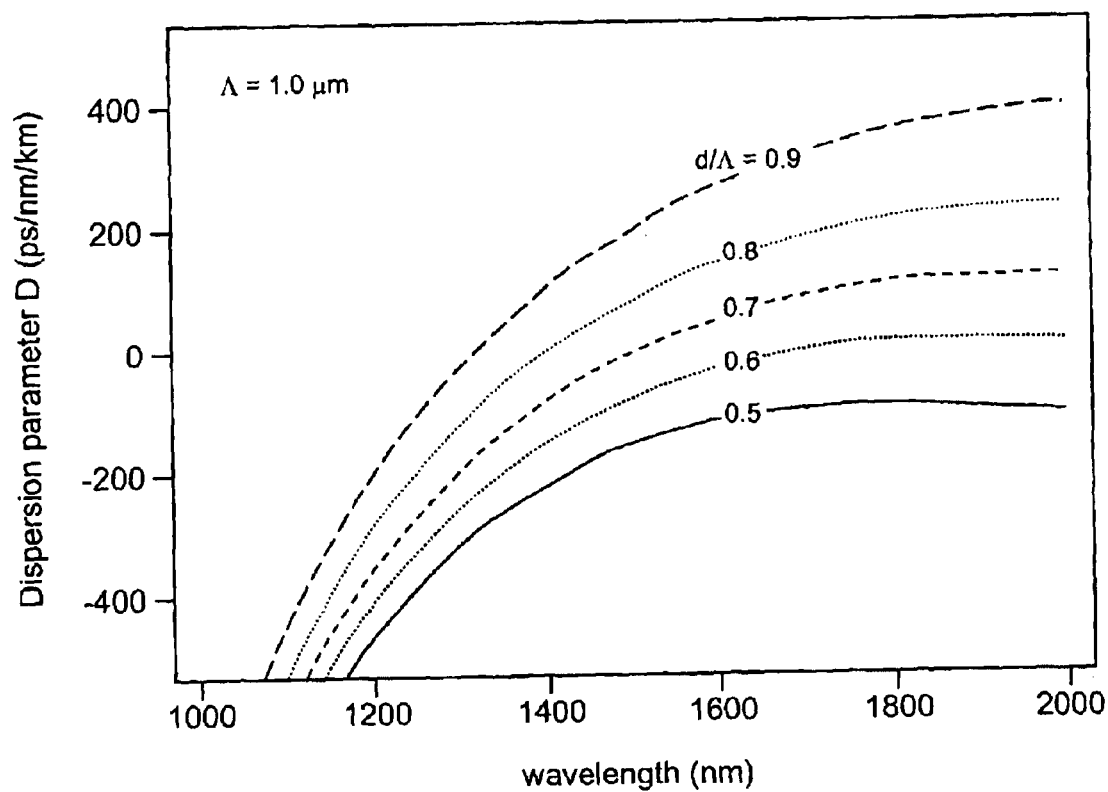
FIG. 4 is a graph illustrating the total dispersion D calculated as a function of wavelength for various hole diameters for a microstructured optical fiber comprising a nonlinear glass.

In FIG. 4, calculated dispersion D (including the material and waveguide contributions) is illustrated as a function of wavelength $\lambda$ for a pitch $\Lambda$ of 2000 nm for various hole diameters d between 200 and 1800 nm of the PCF of FIG. 1. As can be seen, the PCF configuration (the hole diameter in this particular instance) can be controlled to control the dispersion D. A zero point dispersion D can be achieved at a wavelength of approximately 1200 nm. While FIG. 4 illustrates the dispersion calculated for the PCF 10 made from the specific highly nonlinear material Sample #1, the technique of course is general to other highly nonlinear materials. [IS THIS REALLY 2000 NM OR 1000 NM PITCH?]

Preferably the material of the core region 20 has a $\gamma$ of at least about $2.5 \times 10^{-19}$ m$^2$/W at a wavelength of 1260 nm. More preferably the material of the core has a $\gamma$ of at least about $1.0 \times 10^{-18}$ m$^2$/W at a wavelength of 1260 nm, and most preferably at least about $2.0 \times 10^{-18}$ m$^2$/W at a wavelength of 1260 nm. By comparison the $\gamma$ of silica is $2.5 \times 10^{-20}$ m$^2$/W.

Possible nonlinear materials for the core region 20 include sulfide glasses, germanium arsenosulfide glasses, germanium arsenosulfoselenide glasses, germanium arsenoselenide glasses, heavy metal oxide glasses, and tellurite glasses. Tables I, II, III, IV, V, and VI list a number appropriate non-linear materials (identified as Glass #) for the core and atomic mol percents of their components. Also listed is the absorption edge wavelength, $\lambda_0$, and $\gamma$ for each of the nonlinear materials. The intensity independent component of the index of refraction, $n_0$, is listed for some of the materials. The wavelength for which the $\gamma$ were measured is also listed in the tables.

TABLE I

Nonlinear Properties of GeAs Sulfide Glasses

| Glass # | Components (atomic mol percent) | | | $\lambda_0$(nm) | $n_0$(1260 nm) | $\gamma(10^{-20}$ m$^2$/w) (1260 nm) |
|---|---|---|---|---|---|---|
| | Ge | As | S | | | |
| 2 | 22.1 | 8.9 | 69.0 | 523 | 2.31 | 254 |
| 3 | 22.8 | 9.1 | 68.1 | 523 | 2.33 | 252 |
| 4 | 23.5 | 9.4 | 67.1 | 523 | 2.33 | 234 |
| 5 | 24.2 | 9.7 | 66.1 | 518 | 2.33 | 270 |
| 6 | 25 | 10 | 65 | 519 | 2.29 | 256 |
| 7 | 25.8 | 10.3 | 63.8 | 537 | 2.32 | 253 |
| 8 | 26.7 | 10.7 | 62.6 | 551 | 2.29 | 238 |
| 9 | 27.7 | 11.1 | 61.2 | 575 | 2.35 | 250 |
| 10 | 28.7 | 11.5 | 59.8 | 599 | 2.34 | 304 |
| 11 | 32.1 | 12.9 | 55.0 | 636 | 2.43 | 379 |
| 12 | 35.7 | 14.3 | 50 | 703 | 2.67 | 502 |
| 13 | 17.5 | 17.5 | 65 | 539 | 2.37 | 442 |
| 14 | 18.2 | 18.2 | 63.7 | 553 | 2.42 | 364 |
| 15 | 20 | 20 | 60 | 562 | 2.47 | 373 |
| 16 | 22.5 | 22.5 | 55 | 647 | 2.48 | 456 |
| 17 | 25 | 25 | 50 | 699 | 2.53 | 596 |
| 18 | 27.5 | 27.5 | 45 | 730 | 2.65 | 727 |
| 19 | 11.7 | 23.3 | 65 | 548 | 2.46 | 375 |
| 20 | 12.5 | 25 | 62.5 | 560 | 2.50 | 402 |
| 21 | 13.3 | 26.7 | 60 | 574 | 2.43 | 414 |
| 22 | 15 | 30 | 55 | 577 | 2.48 | 405 |
| 23 | 16.7 | 33.3 | 50 | 686 | 2.63 | 589 |

TABLE II

Nonlinear Properties of Miscellaneous Sulfide Glasses

| Glass # | Components (atomic mol percent) | | | | $\lambda_0$(nm) | $\gamma(10^{-20}$m$^2$/w) (1250 nm) |
|---|---|---|---|---|---|---|
| | Ge | Ga | Ba | S | | |
| 24 | 26.8 | 7.8 | | 65.4 | 460 | 93 |
| 25 | 22.9 | 10.7 | 2.3 | 64.1 | 460 | 77 |

TABLE III

Nonlinear Properties of GeAs Selenide Glasses

| Glass # | Components (weight percent) | | | | $\lambda_0$(nm) | $n_0$(1250 nm) | $\gamma(10^{-20}$ m$^2$/w) |
|---|---|---|---|---|---|---|---|
| | Ge | As | Se | S | | | |
| 26 | 22.2 | 44.4 | 33.3 | 0 | 900 | 3.075 | 1999 |
| 27 | 20 | 40 | 40 | 0 | 849 | 2.941 | 1630 |
| 28 | 18.2 | 36.4 | 45.5 | 0 | 812 | 2.853 | 1320 |
| 29 | 15.4 | 30.8 | 53.9 | 0 | 770 | 2.603 | 1500 |
| 30 | 12.5 | 25 | 62.5 | 0 | 763 | | 1320 |
| 31 | 11.1 | 22.2 | 66.7 | 0 | 775 | 2.77 | 1190 |
| 32 | 10 | 20 | 70 | 0 | 785 | | 1270 |

TABLE IV

Nonlinear Properties of GeAs Sulfoselenide Glasses

| Glass # | Components (atomic mol percent) | | | | $\lambda_0$ (nm) | $n_0$(1250 nm) | $\gamma(10^{-20}$ m$^2$/w) |
|---|---|---|---|---|---|---|---|
| | Ge | As | Se | S | | | |
| 33 | 15.4 | 30.8 | 43.1 | 10.8 | 740 | 2.677 | 1430 |
| 34 | 15.4 | 30.8 | 32.3 | 21.5 | 715 | 2.577 | 1090 |
| 35 | 15.4 | 30.8 | 26.9 | 26.9 | 699 | 2.525 | 908 |
| 36 | 15.4 | 30.8 | 21.5 | 32.3 | 679 | 2.473 | 567 |
| 37 | 15.4 | 30.8 | 10.8 | 43.1 | 646 | 2.35 | 543 |
| 38 | 15.4 | 30.8 | 5.4 | 48.5 | 622 | 2.331 | 397 |

TABLE V

Nonlinear Properties of Heavy Metal Oxide Glasses

| Glass # | Components (atomic mol percent) | | | | | $\lambda_0$(nm) | $\gamma (10^{-20}$m$^2$/w) (1250 nm) |
|---|---|---|---|---|---|---|---|
| | Tl$_2$O | PbO | Bi$_2$O$_3$ | TeO$_2$ | RO$_x$ | | |
| 39 | 30 | | 50 | | 20 | 550 | 110 |
| 40 | | 57.2 | 24.9 | | 17.8 | 480 | 72 |
| 41 | | 60 | | 25 | 15 | 400 | 43 |
| 42 | | 64.1 | 14.2 | | 21.8 | 460 | 60 |

In Table V, $RO_x$ refers to oxide components which are not believed to contribute substantially to raising γ. For both 39 and 40, $RO_x = Ga_2O_3$; for 41, $RO_x = SiO_2$; and for 42, $RO_x = B_2O_3 + SiO_2$.

TABLE VI

Nonlinear Properties of Tellurite Glasses

| Glass # | Components (atomic mol percent) | | | $\lambda_0$(nm) | $\gamma (10^{-20} m^2/w)$ (1050 nm) |
|---|---|---|---|---|---|
| | BaO | ZnO | $TeO_2$ | | |
| 43 | 7.5 | 7.5 | 85 | 360 | 49 |
| 44 | 20 | 20 | 60 | 350 | 29 |

By comparison, γ for fused silica is $2.5 \times 10^{-20}$ $m^2/W$.

Figure 5:
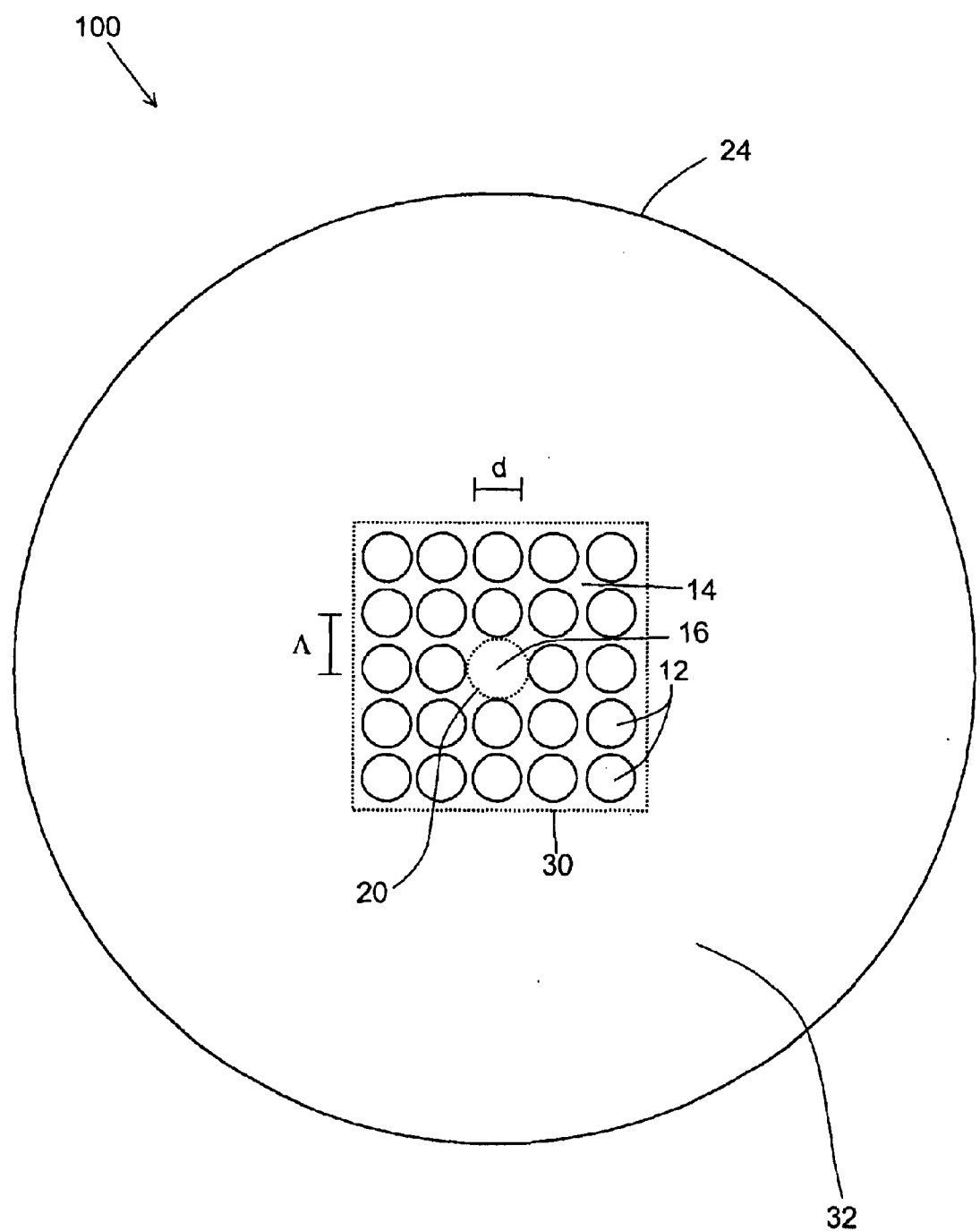
FIG. 5 illustrates a cross-section of a microstructured optical fiber according to another embodiment of the invention, where the columns are arranged in a square lattice.

FIG. 5 illustrates another preferred embodiment of the invention, which is similar in many respects to the embodiment of FIG. 1. Like elements are denoted by the same reference numerals, and a full description of those elements has been omitted to reduce redundancy. The waveguide 100 of FIG. 5 differs from the embodiment of FIG. 1 in that the lattice is square. In FIG. 5, two courses of columns are shown; the skilled artisan will recognize that more or less columns may be used.

The linear absorption loss, α, is an important parameter for the waveguide for many applications. For example, for the parametric amplification and the optical phase conjugation applications described above, the efficiency of the interaction is proportional to the square of the nonlinearity, $\gamma^2$, and inversely proportional to the light intensity in the waveguide. The light intensity decreases exponentially as a function of the product of the length traveled in the fiber by the light, and α. Thus, an approximate figure of merit for the waveguides of the present invention is the ratio of the nonlinearity γ to the linear absorption loss, α, with a higher γ/α being better.

The microstructured optical waveguides of the present invention may be constructed to have an improved γ/α as compared to that of silica PCFs. For silica γ is $2.5 \times 10^{-20}$ $m^2/W$ and α is 0.2 dB/km at about 1550 nm, and γ/α is therefore about $1.2 \times 10^{-19}$ $km\text{-}m^2/dB\text{-}W$. By contrast the waveguide of the present invention uses material with a much better γ/α. The ratio γ/α is preferably greater than about $5.0 \times 10^{-21}$ $km\text{-}m^2/dB\text{-}W$, more preferably greater than about $5.0 \times 10^{-19}$ $km\text{-}m^2/dB\text{-}W$, and most preferably greater than about $2.0 \times 10^{-18}$ $km\text{-}m^2/dB\text{-}W$. Preferably the ratio of the dispersion to the γ is less than about $4.0 \times 10^{-19}$ $ps\text{-}W/nm\text{-}km\text{-}m^2$.

The waveguide of the present invention made be made in the form of a microstructured optical fiber using, for example, a "stack and draw" method. The stack and draw method of forming a microstructured optical fiber is generally known for making silica-based microstructured optical fibers. The stack and draw method is applied here to making microstructured optical fibers based on highly nonlinear materials.

In the stack and draw method, tubes of desired nonlinear material are fabricated with a desired inner and outer diameter. The outer surface of the tubes are then ground to the desired shape. For example, if the columns that are ultimately to be formed in the microstructured optical fiber have a hexagonal pattern, the tubes may be ground to have a hexagonal shape; if the pattern is square, the shape may also be square.

The ground tubes are then drawn into capillary tubes to reduce their diameter, while maintaining their outer shape. The capillary tubes are stacked in the desired pattern, for example to have a hexagonal or square pattern. In the center of the stacked arrangement, a solid tube is substituted for a capillary. The solid tube will ultimately form the core region of the microstructured optical fiber. The stacked arrangement may be sleeved with a solid tube. The stacked arrangement and solid tube is then drawn again to form the microstructured optical fiber. The draw temperature will be different depending on the material to be drawn, and will typically be at a temperature such that the viscosity of the material is about $10^5$ to 106 poise. For example for the Sample # 20 glass listed in table I, the draw temperature will be about 475° C.

The tubes may be formed by spin casting molten liquid, where molten liquid is spun in a larger container and cooled to form a tube. For example, tubes made from chalcogenide glasses may be formed in this way. The tubes may be formed, for example, in a two apparatus process where the batch material is loaded into a melting ampoule, and then melted and quenched to form a solid cylindrical rod. The glass rod is then loaded into a forming ampoule, melted, spun cast on a mechanical lathe and quenched into glass tubing. Alternatively, the tubes may be formed in a one apparatus process where the batch materials are loaded into an ampoule, heated, and then the hot ampoule is spun on a lathe.

Alternatively, the tubes may be formed via an extrusion process. For example, cylindrical discs of the tube material may be extruded into a tube at a viscosity near the softening point of the material, i.e., the temperature at which the viscosity is about $10^{7.6}$ poise.

The shaped tubes may be formed by methods other than grinding a tube. For example, the shaped tubes may be formed by extrusion using a shaped die, such as a hexagonal or square shaped die. Forming the shaped tubes by extrusion has the advantage of eliminating the need for a grinding step.

The tubes may be stacked without providing a flat surface to the outside of the tube, i.e., the tubes outer surface may be left as circular. While circular outer cross-section tubes may be more difficult to stack, the fiber drawn from stacked circular tubes will have more holes (due to the spaces between the tubes) in the cladding region. The greater number of holes in the cladding region may allow for a greater decrease in dispersion in the fiber.

Figure 6:
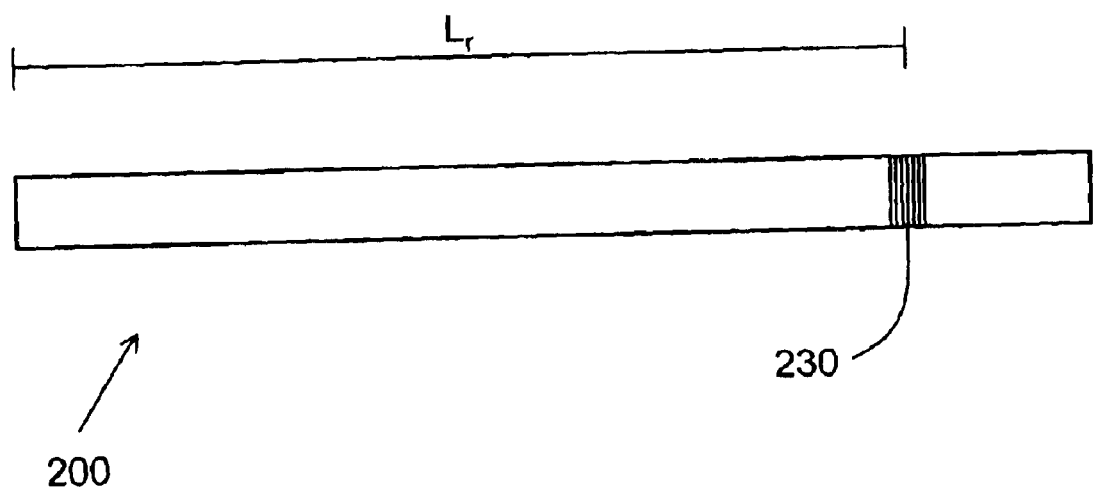
FIG. 6 illustrates a cross-section of a microstructured optical waveguide, according to another embodiment of the invention, where the cross-section is perpendicular to the long axis of the waveguide and the waveguide includes a reflective region.

In another aspect of the present invention, a device using the above-described fiber is provided. The high nonlinearity and low dispersion allows for may nonlinear effects to be exploited by the skilled artisan. While the embodiments below are described with reference to the waveguides of FIGS. 1 and 5, the skilled artisan will recognize that alternative microstructural arrangements may be used in this aspect of the invention. FIG. 6 illustrates an embodiment of the invention that can act as an intensity dependent filter to reflect light input into the waveguide 200 at a desired wavelength at low optical powers, but passes light input at higher power. The waveguide 200 of FIG. 6 is similar to the embodiments of FIG. 1 and FIG. 5. The embodiment of FIG. 6, however, differs from the embodiment of FIGS. 1 and 5 in that the waveguide 200 of FIG. 5 includes a reflective region 230 within the waveguide 200.

FIG. 6 is cross-section of the optical waveguide 200 parallel to the long axis of the waveguide 200. The cross-section of the optical waveguide 200 perpendicular to the long axis will look the same as that of FIG. 1 or 5. The reflective region 230 acts to reflect light propagating in the waveguide 200 in a certain narrow range of wavelengths. The range of wavelengths that are reflected is centered at a reflection wavelength $\lambda_r$. The reflection wavelength $\lambda_r$ is chosen to be at a desired wavelength.

The reflective region 230 may comprise, for example, a fiber Bragg grating, as is known in the art. The grating spacings are set at distance such that light with a wavelength within the band of wavelengths centered at the reflection wavelength is reflected by the fiber Bragg grating. The fiber Bragg grating may be formed by writing the grating using a laser light source providing an appropriate excitation wavelength. For example, if the gratings are to be written in sulfide glass material, the laser light source may be a pulsed laser source providing an excitation wavelength in a range between about 760 and 850 nm. The laser may be a Ti-sapphire laser, for example. The waveguide may be translated along its axial direction as the laser pulses are sequentially directed onto the waveguide to sequentially provide the gratings. Alternatively, the gratings may be formed by using other techniques, such as by using a phase mask.

The waveguide 200 acts as an intensity dependent filter that passes high power light, but reflects low power light. Light propagating in the waveguide shifts in wavelength due to the nonlinearity in the material. High power light incident in the waveguide at the reflection wavelength $\lambda_r$ may shift sufficiently in wavelength so that it is no longer in the band of wavelengths reflected by the reflective region 230. In this case the light would pass through the reflective region 230.

The shifting of the light wavelength depends on the light power, the length of waveguide, $L_r$, that the light travels in prior to reaching the reflective region, and the nonlinearity of the waveguide core material (, and as discussed below the light loss in the waveguide). The shift is greater for higher light power, longer $L_r$, and higher nonlinearity $\gamma$. The shift in wavelength due to the nonlinearity is due to a nonlinear phenomenon called cross phase modulation. Dispersion, however, counteracts the effects of the nonlinearity because the dispersion will tend to broaden a light pulse and thus to decrease the power density of the pulse. Thus, the waveguide 200 with a low dispersion and comprising a highly nonlinear core material works well as an optical intensity dependent filter.

The distance $L_r$ that the reflective region is from the point at which light is launched into the fiber should be sufficient such that at a target light power, the light is not reflected.

Figure 7:
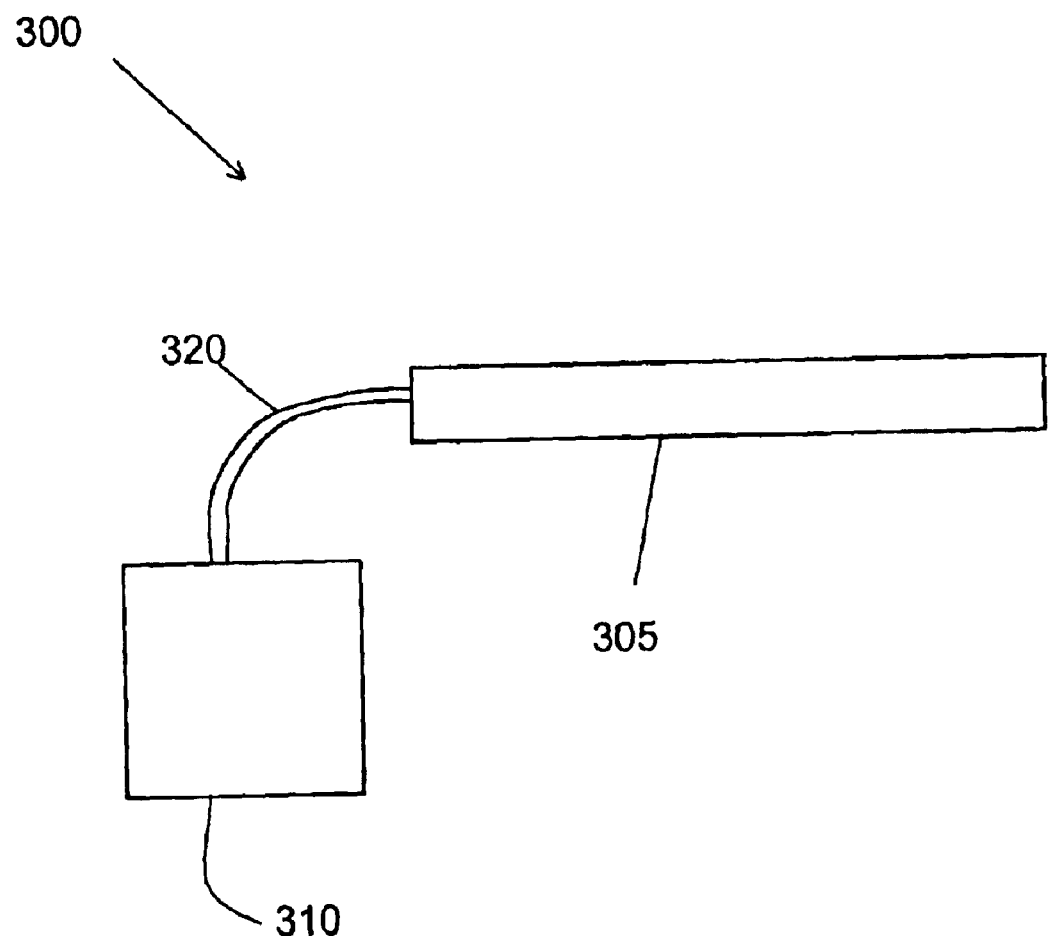
FIG. 7 is a schematic illustration of an embodiment of an optical system including a waveguide according to the present invention.

FIG. 7 illustrates schematically another preferred embodiment of the invention illustrating an optical communication system 300 including a waveguide 305 as described in the embodiments of FIG. 1 or 5. The optical communications system 300 additionally includes a signal radiation source 310 that provides a signal at a desired wavelength, for example at a wavelength of less than 2000 nm. The system 300 also includes a signal coupler 320 that couples the signal into the optical waveguide 305 as is known in the art. The radiation source 310 may comprise a laser, such as semiconductor laser, or a light emitting diode, for example. The radiation source 310 may also simply comprise a telecommunications fiber.

The system 300 may be a system that provides a pulse signal where the pulse signal propagates in the waveguide 305 as a soliton pulse. The soliton pulse phenomenon depends on the optical nonlinearity of the waveguide optical fiber in which the pulse propagates. The width of a soliton pulse remains the same as it propagates in a fiber, i.e., the pulse does not broaden. The soliton pulse phenomenon results from a balancing of the broadening of the pulse through dispersion with the narrowing of the pulse produced by the nonlinear effect of self-phase modulation. For soliton propagation, the waveguide 305 may constructed, for example, to support a soliton having a center wavelength of about 1500 nm, a width of about 10 ps and a power of less than about 1 mW over a distance of about 100 m in the waveguide 305.

The peak power, P, required to support the fundamental soliton is given by the following equation: $P(\text{Watts}) = 0.495\lambda^2 |D|/(c\gamma T^2_{FWHM})$ where $|D|$ is the absolute value of the dispersion D of the waveguide 305, $\lambda$ is the central wavelength of the soliton pulse, c is the speed of light, $\gamma$ is the nonlinearity parameter discussed above, and $T_{FWHM}$ is the full width half maximum pulse width. Because the power required to support a soliton varies inversely with $\gamma$, the improved nonlinearity of the waveguide 305 allows the power required to support a soliton pulse to be substantially reduced as compared to soliton pulse propagation in a silica-based waveguide.

It should be noted that for soliton propagation applications, the pulse shape is maintained by balancing broadening due to dispersion with narrowing due to the non-linear effect of self phase modulation. Therefore, in soliton applications the dispersion D of the waveguide 305 should be slightly positive and should be of sufficient magnitude to balance the non-linear self phase modulation.

Figure 8:
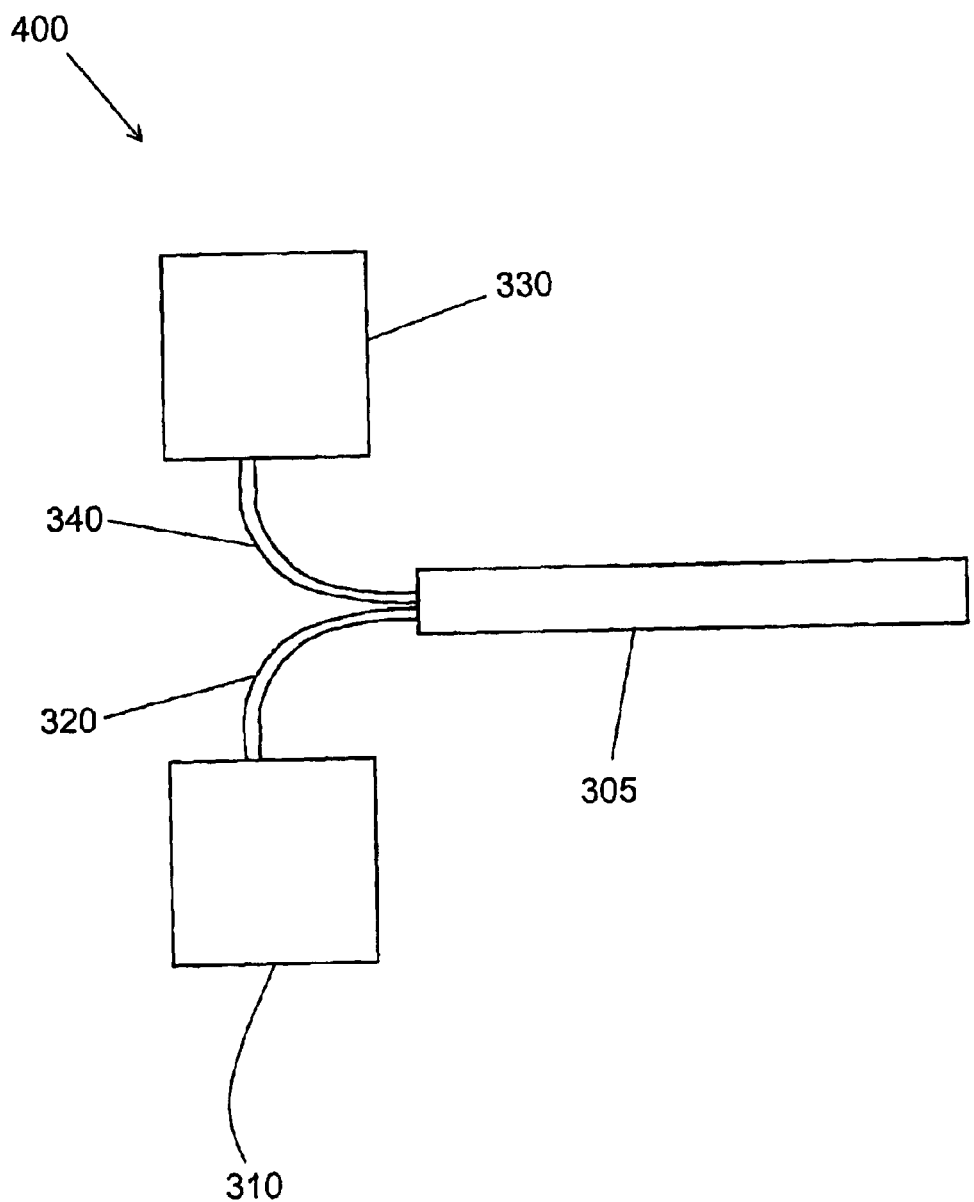
FIG. 8 is a schematic illustration of an embodiment of an optical system for parametric amplification according to the present invention.

FIG. 8 illustrates an optical communications system 400 of FIG. 7 in more detail for a system that provides parametric amplification of a signal. The parametric amplification system of FIG. 8 includes a pump radiation source 330 and pump radiation coupler 340 in addition to a waveguide 305, signal radiation source 310 and signal coupler 320 illustrated in FIG. 7. The pump radiation coupler 340 couples the pump radiation from the pump radiation source 330 into the waveguide 305 such that the signal from the signal radiation source 310 is amplified in the waveguide 305. The pump radiation source 330 maybe a laser such as a semiconductor laser, for example.

For parametric amplification the pump radiation is used to transfer power to the signal. Assuming all polarizations are parallel for ease of illustration, the nonlinear portion of the induced polarization, $P_s$, can be given as $P_s = \chi_{1111}(\omega_s = 2\omega_p - \omega_i)E_pE_pE_i$, where the subscripts s, p, and i denote the amplified signal, pump, and incident signal, respectively, $\omega_s = 2\omega_p - \omega_i$ is the conservation of energy requirement, E are the electric fields, and $\chi_{1111}$ is the <1111> tensor component of $\chi_{(3)}$.

In general, the efficiency of the amplification process will depend upon the mismatch of the axial propagation constants (the propagation constants for propagation in the direction along the axis of the waveguide) between the pump beam, the incident signal, and the amplified signal. The efficiency will be greatest if the relative phase of the pump beam and the signal changes slowly, and thus is greater for smaller $\Delta\beta$. The propagation constant mismatch is given as $\Delta\beta = 2\beta_p - \beta_i\beta\beta_s$, where $\beta_p$, $\beta_I$, and $\beta_s$ are propagation constants for the pump, incident signal, and amplified signal, respectively. The overall process efficiency is diminished by the phase mismatch according to the expression: $\sin^2(\Delta\beta L)/\Delta\beta^2$, where L is the distance traveled by the light along the waveguide.

The phase mismatch increases with increasing dispersion, and thus the propagation mismatch $\Delta\beta$, and the amplification process efficiency can be increased by decreasing the dispersion D. The optical waveguide 305 as described above can provide both a low dispersion D, and good amplification properties through the high nonlinearity of the core material, and thus is an excellent choice for the parametric amplification system of FIG. 8.

Figure 9:
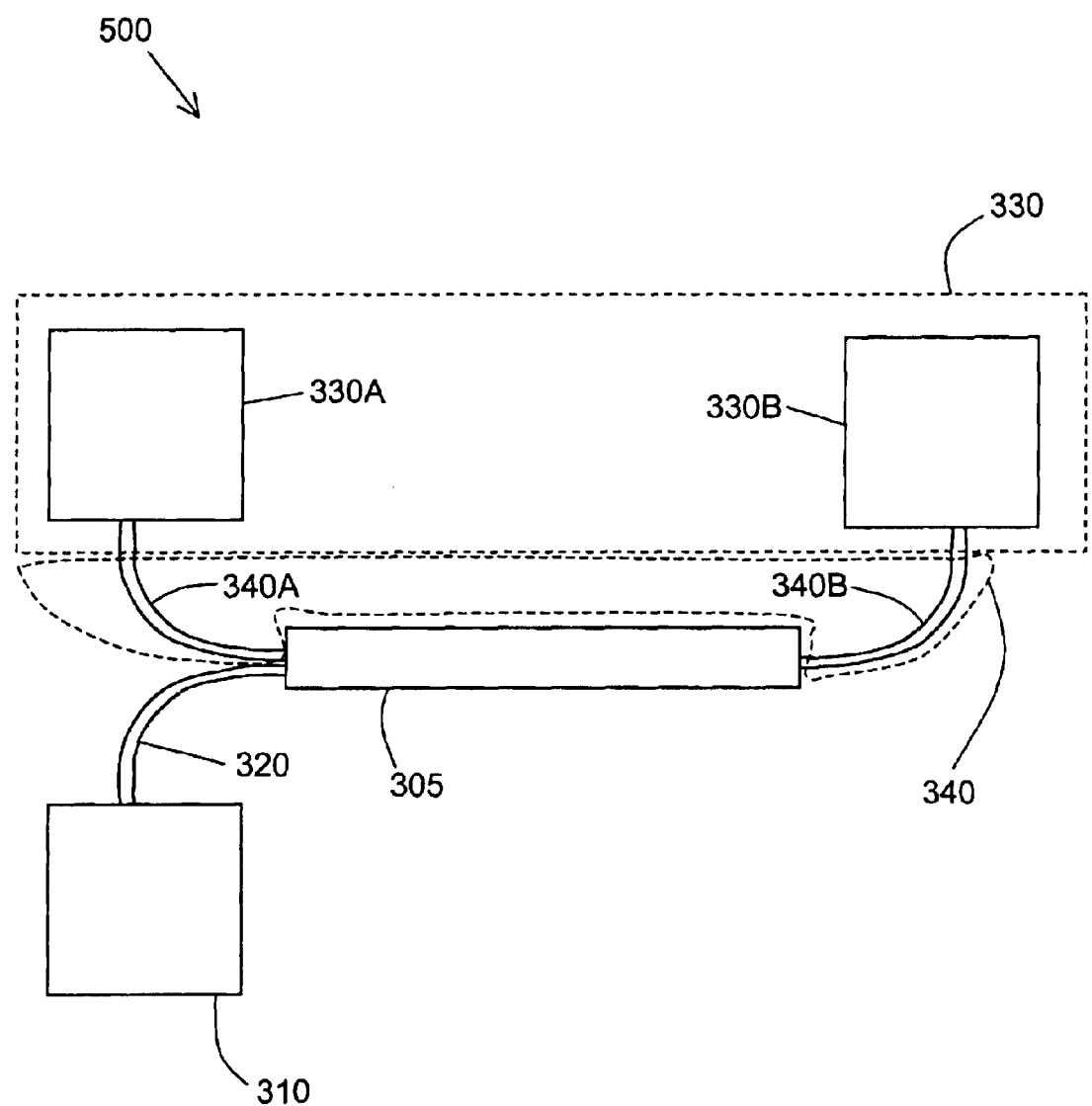
FIG. 9 is a schematic illustration of an embodiment of an optical system for optical phase conjugation according to the present invention.

FIG. 9 illustrates an optical communications system 500 similar to that of FIG. 8, but employs two pump radiation sources and two pump radiation couplers for optical phase conjugation. The optical phase conjugation system of FIG. 9 includes a pump radiation source 330, pump radiation coupler 340, waveguide 200, signal radiation source 310 and signal coupler 320 in a similar fashion to the system of FIG. 8. The pump radiation source 330, however, includes a first laser radiation source 330A and a second laser radiation source 330B. Similarly, the pump radiation coupler 340, includes a first coupler 340A and a second coupler 340B.

The first coupler 340A couples first pump radiation from the first laser radiation source 330A into a first end of the waveguide 305. The second coupler 340B couples second pump radiation from the second laser radiation source 330B into a second end of the waveguide 200 opposite to the first end of the waveguide 305. The signal coupler 320 couples a signal into the waveguide 305 at one end of the waveguide 305. In this way conjugate wave radiation is induced and propagates in a direction opposite to the direction that the signal radiation propagates.

In the optical phase conjugation system of FIG. 9 phase mismatch occurs in a similar fashion to the mismatch for the parametric amplification system of FIG. 8. The propagation mismatch for the optical phase conjugation system of FIG. 9 is given by $\Delta\beta=\beta_s-\beta_c$, where $\beta_s$ and $\beta_c$, respectively, are the propagation constants of the signal and the conjugate signal. Again the propagation mismatch $\Delta\beta$, and thus the amplification process efficiency can be increased by decreasing the dispersion D. The optical waveguide 305 as described above provides both a low dispersion D, and good amplification properties through high nonlinearity and thus is an excellent choice for the optical phase conjugation system of FIG. 9.

Figure 10:
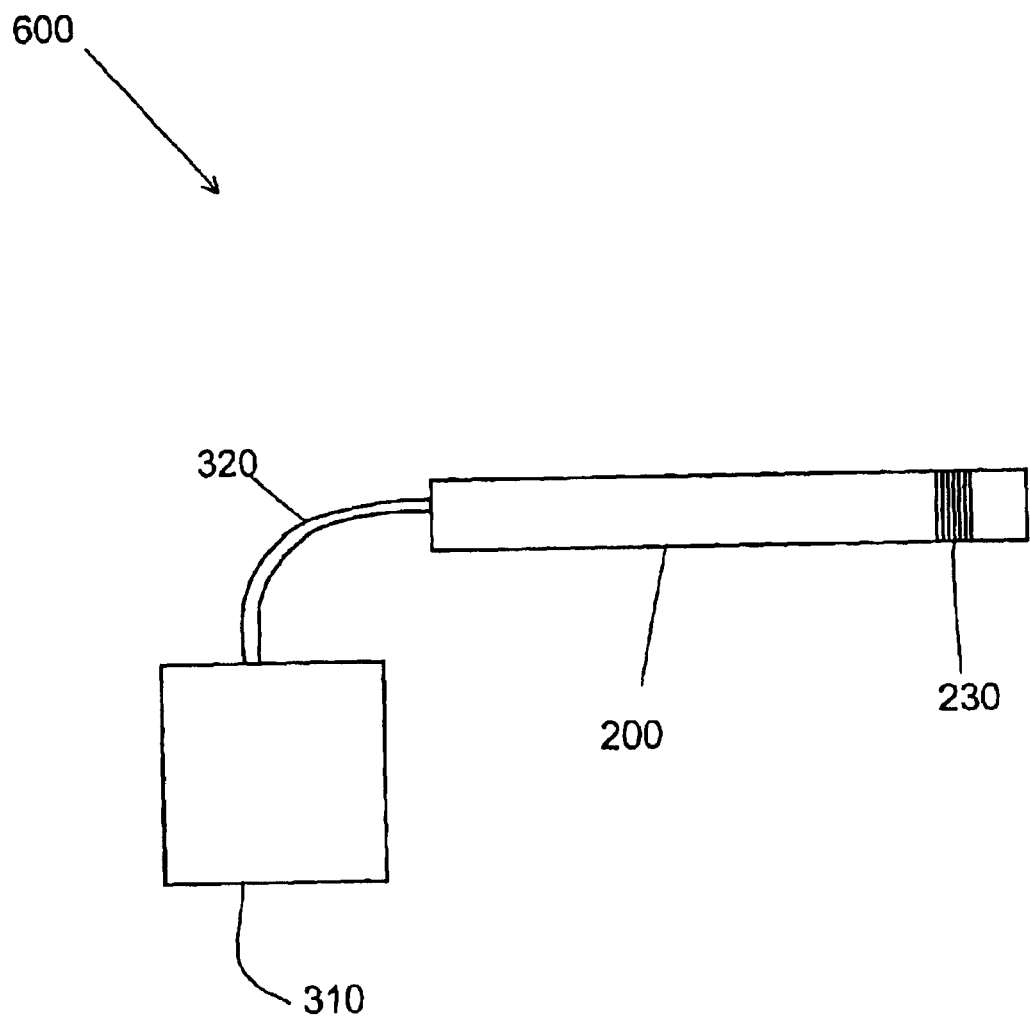
FIG. 10 is a schematic illustration of an embodiment of an optical system that acts as a optical switch according to the present invention.

FIG. 10 illustrates the optical communications system 600 of FIG. 7 in more detail for a system where the waveguide 200 acts as an optical power filter. In addition to the waveguide 200, the optical communications system 600 of FIG. 10 includes a signal radiation source 310 and signal coupler 320 in a similar fashion to that described for the system of FIG. 7. In the optical communications system 600 of the embodiment of FIG. 10, the waveguide 200 includes a reflective region 230 that reflects light at a desired wavelength at low optical power, but passes light input at a higher power. Thus, the waveguide 200 in FIG. 10 is the same as the waveguide 200 of the embodiment of FIG. 6.

The signal radiation source 310 may be a semiconductor laser, for example. Alternatively, the signal radiation source may simply comprise a telecommunications fiber. The signal radiation source 310 provides a signal at a wavelength that is the same as the reflection wavelength $\lambda_r$ of the reflection region 230. The signal input into the waveguide 200 will shift in wavelength due to the nonlinearity of the waveguide 200, and if the signal power is sufficient, the shift will be great enough such that the reflection region will not reflect the signal, but will allow it to pass.

The linear absorption loss, $\alpha$, is an important parameter for the waveguide for many applications. For example, for the parametric amplification and the optical phase conjugation applications described above, the efficiency of the interaction is proportional to the square of the nonlinearity, $\gamma^2$, and inversely proportional to the light intensity in the waveguide 200. The light intensity decreases exponentially as a function of the product of the length traveled in the fiber by the light, and $\alpha$. Thus, an approximate figure of merit for the waveguide 200 is the ratio of the nonlinearity $\gamma$ to the linear absorption loss, $\alpha$, with a higher $\gamma/\alpha$ being better.

The microstructured optical fiber of the present invention has an improved $\gamma/\alpha$ as compared to that of conventional optical fibers. For silica $\gamma$ is $2.5\times10^{-20}$ m$^2$/W and $\alpha$ is 0.2 dB/km at about 1550 nm, and $\gamma/\alpha$ is therefore about $1.2\times10^{-19}$ km-m$^2$/dB-W. By contrast the waveguide of the present invention uses material with a much better $\gamma/\alpha$. The ratio $\gamma/\alpha$ is preferably greater than about $5.0\times10^{-21}$ km-m$^2$/dB-W, more preferably greater than about $5.0\times10^{-19}$ km-m$^2$/dB-W, and most preferably greater than about $2.0\times10^{-18}$ km-m$^2$/dB-W. Preferably the ratio of the dispersion to the $\gamma$ is less than about $4.0\times10^{-19}$ ps-W/nm-km-m$^2$.

The waveguide of the present invention made be made in the form of a microstructured optical fiber using, for example, a "stack and draw" method. The stack and draw method of forming a microstructured optical fiber is generally known for making silica-based microstructured optical fibers. The stack and draw method is applied here to making microstructured optical fibers based on highly nonlinear materials.

In the stack and draw method, tubes of desired nonlinear material are fabricated with a desired inner and outer diameter. The outer surfaces of the tubes are then ground to the desired shape. For example, if the columns that are ultimately to be formed in the microstructured optical fiber have a hexagonal pattern, the tubes may be ground to have a hexagonal shape; if the pattern is square, the shape may also be square.

The ground tubes are then drawn into capillary tubes to reduce their diameter, while maintaining their outer shape. The capillary tubes are stacked in the desired pattern, for example to have a hexagonal or square pattern. In the center of the stacked arrangement, a solid tube is substituted for a capillary. The solid tube will ultimately form the core region of the microstructured optical fiber. The stacked arrangement may be sleeved with a solid tube. The stacked arrangement and solid tube is then drawn again to form the microstructured optical fiber. The draw temperature will be different depending on the material to be drawn, and will typically be at a temperature such that the viscosity of the material is about $10^5$ to $10^6$ poise. For example for the Sample # 20 glass listed in table I, the draw temperature will be about 475° C.

The tubes may be formed by spin casting molten liquid, where molten liquid is spun in a larger container and cooled to form a tube. For example, tubes made from chalcogenide glasses may be formed in this way. The tubes may be formed, for example, in a two apparatus process where the batch material is loaded into a melting ampoule, and then melted and quenched to form a solid cylindrical rod. The glass rod is then loaded into a forming ampoule, melted, spun cast on a mechanical lathe and quenched into glass tubing. Alternatively, the tubes may be formed in a one apparatus process where the batch materials are loaded into an ampoule, heated, and then the hot ampoule is spun on a lathe.

Alternatively, the tubes may be formed via an extrusion process. For example, cylindrical discs of the tube material may be extruded into a tube at a viscosity near the softening point of the material, i.e., the temperature at which the viscosity is about $10^{7.6}$ poise.

The shaped tubes may be formed by methods other than grinding a tube. For example, the shaped tubes may be formed by extrusion using a shaped die, such as a hexagonal or square shaped die. Forming the shaped tubes by extrusion has the advantage of eliminating the need for a grinding step.

The tubes may be stacked without providing a flat surface to the outside of the tube, i.e., the tubes outer surface may be left as circular. While circular outer cross-section tubes may be more difficult to stack, the fiber drawn from stacked circular tubes will have more holes (due to the spaces between the tubes) in the cladding region. The greater number of holes in the cladding region may allow for a greater decrease in dispersion in the fiber.

The preferred embodiments have been set forth herein for the purpose of illustration. This description, however, should not be deemed to be a limitation on the scope of the invention. It will be apparent to those skilled in the art that various modifications and variations can be made of the present invention without departing from the scope of the invention. Thus, it is intended that the present invention cover the modifications and variations of this invention provided they come within the scope of the appended claims and their equivalents.

What is claimed is:

1. A microstructured optical waveguide, the optical waveguide supporting the propagation of an optical signal of a desired wavelength, the optical waveguide comprising:
   a core region formed from an optically nonlinear material having a γ of about $6\times10^{-19}$ m$^2$/W to $1.999\times10^{-17}$ m$^2$/W at 1260 nm; and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −70 ps/nm-km to below 50 ps/nm-km.

2. A microstructured optical waveguide, the optical waveguide supporting the propagation of an optical signal of a desired wavelength, the optical waveguide comprising:
   a core region formed from an optically nonlinear material having a γ of at least about $2.5\times10^{-19}$ m$^2$/W at 1260 nm; and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −35 ps/nm-km to about 35 ps/nm-km.

3. The optical waveguide of claim 1, wherein the dispersion of the optical signal at the desired wavelength is within the range of about −10 ps/nm-km to about 10 ps/nm-km.

4. The optical waveguide of claim 1, wherein the optically nonlinear material has a γ of at least about $1.0\times10^{-18}$ m$^2$/W at 1260 nm.

5. The optical waveguide of claim 1, wherein the optically nonlinear material has a γ of at least about $2.0\times10^{-18}$ m$^2$/W at 1260 nm.

6. The optical waveguide of claim 1, wherein a core region formed from an optically nonlinear material; and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −70 ps/nm-km to below 50 ps/nm-km, wherein the optical nonlinear material is selected from the group consisting of sulfide glasses, germanium arsenosulfide glasses, germanium arsenosulfoselenide glasses, germanium arsenoselenide glasses, and heavy metal oxide glasses.

7. The optical waveguide of claim 6, wherein the columns are formed as holes in the bulk material of the cladding region.

8. A microstructured optical waveguide, the optical waveguide supporting the propagation of an optical signal of a desired wavelength, the optical waveguide comprising:
   a core region formed from an optically nonlinear material having a γ of at least about $2.5\times10^{-19}$ m$^2$/W at 1260 nm: and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −70 ps/nm-km to about 70 ps/nm-km and wherein the nonlinear optical material of the core has a linear absorption coefficient of less than about 500 dB/km.

9. A microstructured optical waveguide, the optical waveguide supporting the propagation of an optical signal of a desired wavelength, the optical waveguide comprising:
   a core region formed from an optically nonlinear material having a γ of at least about $2.5\times10^{-19}$ m$^2$/W at 1260 nm: and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −70 ps/nm-km to about 70 ps/nm-km and wherein the nonlinear optical material of the core has a linear absorption coefficient, and wherein the ratio of the γ to the linear absorption coefficient is greater than about $5.0\times10^{-21}$ m$^2$-km/W-dB.

10. The optical waveguide of claim 9, wherein the ratio of the γ to the linear absorption coefficient is greater than about $5.0\times10^{-19}$ m$^2$-km/W-dB.

11. The optical waveguide of claim 9, wherein the ratio of the γ to the linear absorption coefficient is greater than about $2.0\times10^{-18}$ m$^2$-km/W-dB.

12. A microstructured optical waveguide, the optical waveguide supporting the propagation of an optical signal of a desired wavelength, the optical waveguide comprising:
   a core region formed from an optically nonlinear material having a γ of at least about $2.5\times10^{-19}$ m$^2$/W at 1260 nm; and
   a cladding region surrounding the core region, the cladding region including a bulk material and a plurality of columns arranged in the bulk material, each column having a cross-sectional area and a refractive index,
   wherein the number, arrangement, refractive indices and areas of the columns are selected such that the dispersion of the optical signal at the desired wavelength is within the range of about −70 ps/nm-km to about 70 ps/nm-km, and the ratio of the dispersion at the desired wavelength to the γ is less than about $4.0\times10^{19}$ ps-W/nm-km-m$^2$.

13. The optical waveguide of claim 9, wherein the optical waveguide supports the propagation of a soliton having a center wavelength of about 1500 nm, a width of about 10 ps and a power of less than about 1 mW over a distance of about 100 m.

14. The optical waveguide of claim 1, further comprising:
a reflection region positioned at a first distance from a first end of the optical waveguide that reflects radiation at the desired wavelength, the first distance being sufficient such that when the signal has a desired power at the first end, the signal is shifted in wavelength due to the optical nonlinear material so that the signal is not reflected by the reflection region.

15. The optical waveguide of claim 14, wherein optical waveguide is an optical fiber and the reflection region comprises a fiber Bragg grating.

16. A microstructured optical fiber, the optical fiber supporting the propagation of an optical signal of a desired wavelength, the optical fiber comprising:
a core region formed from an optically nonlinear material having a γ of about $6 \times 10^{-19}$ $m^2/W$ to $1.999 \times 10^{-17}$ $m^2/W$ at 1260 nm; and
a cladding region surrounding the core region, the cladding region including a bulk material and a plurality of columns arranged in the bulk material, each column having a cross-sectional area and a refractive index,
wherein the number, arrangement, refractive indices and areas of the columns are selected such that the dispersion of the optical signal at the desired wavelength is within the range of about −70 ps/nm-km to below 50 ps/nm-km.

17. The optical fiber of claim 16, wherein the dispersion of the optical signal at the desired wavelength is within the range of about −10 ps/nm-km to about 10 ps/nm-km.

18. The optical fiber of claim 16, wherein the optically nonlinear material has a γ of at least about $2.0 \times 10^{31\ 18}$ $m^2/W$ at 1260 nm.

19. The optical fiber of claim 16, wherein the desired wavelength is between about 1200 nm and 1700 nm.

20. The optical fiber of claim 16, wherein the optically nonlinear material is selected from the group consisting of sulphide, germanium arsenosulphide, germanium arsenosulphoselenide, germanium arsenoselenide, and heavy metal oxide glasses.

21. The optical fiber of claim 16, wherein the arrangement of the columns has a geometry selected from the group consisting of square, triangular, and hexagonal.

22. The optical fiber of claim 16, wherein the material of the core has a linear absorption coefficient, and wherein the ratio of the γ to the absorption coefficient is greater than about $5.0 \times 10^{-21}$ $m^2$-km/W-dB.

23. The optical fiber of claim 22, wherein the optical fiber supports the propagation of a soliton having a center wavelength of abut 1500 nm, a width of about 10 ps and a power of less than about 1 mW over a distance of about 100 m.

24. The optical fiber of claim 16, further comprising:
a fiber Bragg grating positioned at a first distance from a first end of the optical fiber that reflects radiation at the desired wavelength, the first distance being sufficient such that when the signal has a desired power at the first end, the signal is shifted in wavelength due to the optical nonlinear material so that the signal is not reflected by the fiber Bragg grating.

25. An optical communication system for the propagation of an optical signal, the optical communication system comprising:
a microstructured optical waveguide, the optical waveguide supporting the propagation of an optical signal of a desired wavelength, the optical waveguide comprising a core region formed from an optically nonlinear material having a γ of $6 \times 10^{-19}$ $m^2/W$ to $1.999 \times 10^{-17}$ $m^2/W$ at 1260 nm; and a cladding region surrounding the core region, the cladding region including a bulk material and a plurality of columns arranged in the bulk material, each column having a cross-sectional area and a refractive index, wherein the number, arrangement, refractive indices and areas of the columns are selected such that the dispersion of the optical signal at the desired wavelength is within the range of about −70 ps/nm-km to below 50 ps/nm-km;
a signal radiation source for providing the signal at the desired wavelength; and
a signal coupler for coupling the signal into the microstructured optical waveguide.

26. The optical communication system of claim 25, wherein the signal radiation source is a laser radiation source, and wherein the optical waveguide further comprises a reflection region positioned at a first distance from a first end of the optical waveguide that reflects radiation at the desired wavelength, the first distance being sufficient such that when the signal has a desired power at the first end, the signal is shifted in wavelength due to the optical nonlinear material so that the signal is not reflected by the reflection region.

27. The optical communication system of claim 25, wherein the signal radiation source includes a laser radiation source.

28. The optical communication system of claim 27, wherein the optical waveguide supports the propagation of a soliton having a center wavelength of about 1500 nm, a width of about 10 ps and a power of less than about 1 mW over a distance of about 100 m, and wherein the laser radiation source provides the signal at the desired wavelength as a pulse, and the pulse propagates in the optical waveguide as a soliton.

29. The optical communication system of claim 25, wherein the signal coupler couples the signal into the waveguide at a first end of the waveguide, the optical communication system further comprising:
a pump radiation source; and
a pump radiation coupler,
wherein the pump radiation source comprises a first laser radiation source and a second laser radiation source, the pump radiation coupler comprises a first coupler and a second coupler, and wherein the first coupler couples first pump radiation from the first laser radiation source into the first end of the waveguide and the second coupler couples second pump radiation from the second laser radiation source into a second end of the waveguide opposite to the first end of the waveguide such that conjugate wave radiation is induced and propagates in a direction opposite to a direction that the signal radiation propagates.

30. The optical communication system of claim 25, wherein the signal coupler couples the signal into the waveguide at a first end of the waveguide, the optical communication system further comprising:
a pump radiation source; and
a pump radiation coupler that couples pump radiation from the pump radiation source into the waveguide such that the signal is amplified.

* * * * *